United States Patent
Lim et al.

(10) Patent No.: US 9,154,474 B2
(45) Date of Patent: Oct. 6, 2015

(54) COMMUNICATION SECURITY METHOD AND APPARATUS OF FIRST NODE AND SECOND NODE COMMUNICATING BASED ON FULL DUPLEX COMMUNICATION SCHEME USING NEAR FIELD

(75) Inventors: Jong Bu Lim, Yongin-si (KR); Ui Kun Kwon, Hwaseong-si (KR); Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 13/464,201

(22) Filed: May 4, 2012

(65) Prior Publication Data
US 2013/0156191 A1 Jun. 20, 2013

(30) Foreign Application Priority Data
Dec. 16, 2011 (KR) .................. 10-2011-0136528

(51) Int. Cl.
  H04L 29/06 (2006.01)
  G06K 19/07 (2006.01)
  H04B 5/00 (2006.01)
  H04B 5/02 (2006.01)

(52) U.S. Cl.
  CPC ........ *H04L 63/0492* (2013.01); *G06K 19/0723* (2013.01); *H04B 5/0031* (2013.01); *H04B 5/02* (2013.01)

(58) Field of Classification Search
  USPC ........................................................ 380/270
  See application file for complete search history.

(56) References Cited

U.S. PATENT DOCUMENTS

| 7,245,213 | B1 |   | 7/2007 | Esterberg et al. |
| 8,811,620 | B2 | * | 8/2014 | Chaves et al. ................. 380/282 |
| 2004/0044911 | A1 | * | 3/2004 | Takada et al. ................. 713/201 |
| 2005/0152538 | A1 | * | 7/2005 | Stedron et al. .................. 380/28 |
| 2008/0106385 | A1 | * | 5/2008 | Kelley et al. ................. 340/10.5 |

(Continued)

FOREIGN PATENT DOCUMENTS

| KR | 10-2007-0072051 A | 7/2007 |
| KR | 10-2011-0054737 A | 5/2011 |

(Continued)

OTHER PUBLICATIONS

Near Field Screech Noise Computation|http://ntrs.nasa.gov/archive/nasa/casi.ntrs.nasa.gov/20010092202.pdf|Loh et al.|Aug. 2001|p. 1-16.*

(Continued)

*Primary Examiner* — Mahfuzur Rahman
(74) *Attorney, Agent, or Firm* — NSIP Law

(57) ABSTRACT

A communication security method and apparatus of a first node and a second node are provided. The first node and the second node communicate with each other based on a full duplex communication scheme using a near field. In the communication security method and apparatus, information to be transmitted may be encrypted based on received information and the encrypted information may be transmitted, in a TX node and an RX node. The communication security method and apparatus prevent an additional node from decrypting the information, and ensure transmission and reception of reliable data. In addition, the communication security method and apparatus prevent information from being decrypted in a physical layer, by periodically or aperiodically exchanging a new encryption key.

24 Claims, 14 Drawing Sheets

(56) References Cited

U.S. PATENT DOCUMENTS

| | | | |
|---|---|---|---|
| 2009/0015385 A1* | 1/2009 | Teuwen et al. | 340/10.51 |
| 2009/0103733 A1* | 4/2009 | Falk et al. | 380/277 |
| 2009/0128392 A1 | 5/2009 | Hardacker et al. | |
| 2009/0144550 A1 | 6/2009 | Arunan | |
| 2009/0175445 A1* | 7/2009 | Shin et al. | 380/201 |
| 2009/0219132 A1* | 9/2009 | Maytal et al. | 340/5.8 |
| 2010/0210212 A1* | 8/2010 | Sato | 455/41.3 |
| 2011/0274275 A1* | 11/2011 | Seitz | 380/270 |
| 2011/0276710 A1* | 11/2011 | Mighani et al. | 709/231 |
| 2011/0320805 A1* | 12/2011 | Chaves et al. | 713/150 |
| 2013/0003553 A1* | 1/2013 | Samuels et al. | 370/235 |
| 2013/0005352 A1* | 1/2013 | Jones et al. | 455/456.1 |

FOREIGN PATENT DOCUMENTS

| | | |
|---|---|---|
| WO | WO 2006/114768 A1 | 11/2006 |
| WO | WO 2006/131861 A1 | 12/2006 |
| WO | WO 2010/145618 A1 | 12/2010 |

OTHER PUBLICATIONS

European Search Report issued Mar. 25, 2013 in counterpart European Patent Application No. 12178592.7 (6 pages, in English).

* cited by examiner

COMMUNICATION SECURITY METHOD AND APPARATUS OF FIRST NODE AND SECOND NODE COMMUNICATING BASED ON FULL DUPLEX COMMUNICATION SCHEME USING NEAR FIELD

CROSS-REFERENCE TO RELATED APPLICATION(S)

This application claims the benefit under 35 U.S.C. §119(a) of Korean Patent Application No. 10-2011-0136528, filed on Dec. 16, 2011, in the Korean Intellectual Property Office, the entire disclosure of which is incorporated herein by reference for all purposes.

BACKGROUND

1. Field

The following description relates to a communication security method and apparatus of a first node and a second node communicating with each other based on a full duplex communication scheme using a near field.

2. Description of Related Art

A security technology used in a general communication system employs an encryption scheme in layer 2, layer 3, or other higher order layers. The encryption scheme may be used to encrypt data for transmission and reception of data by a public-key encryption or a private key encryption. The encryption scheme may ensure security based on a mathematical logic, regardless of a characteristic of a physical layer, namely, a characteristic of a communication channel. For example, when a communication device, outside devices secured to communicate with each other, acquires information on how to decrypt an encrypted text through a predetermined route, communication security between the devices may be useless.

In particular, in a near field channel, communication devices may individually detect a change in a near field based on a change in positions of the communication devices within the near field. For example, a transmitter may determine whether a receiver exists within a near field, and whether a communication device, other than the receiver and the transmitter, exists within the near field by transmitting a signal or the like. In an example in which the communication device exists within the near field while the transmitter transmits information to the receiver, the transmitter may transmit energy using an Induced Energy (IE) modulation scheme based on a characteristic of the near field to prevent the communication device from decrypting the information.

However, when the communication device is disposed close to either the transmitter or the receiver, the communication device may decrypt information of either the transmitter or the receiver.

SUMMARY

In accordance with an illustrative example, a communication security method of a first node includes receiving first information from a second node at a previous time, the previous time being recognized by the first node and the second node. The communication security method also includes encrypting second information using the first information and information on the previous time. The communication security method includes transmitting the encrypted second information to the second node at a next time.

In accordance with another illustrative example, a communication security method of a second node includes transmitting first information to a first node at a previous time, the previous time being recognized by the first node and the second node. The communication security method includes receiving encrypted second information from the first node at a next time, and decrypting the encrypted second information using the first information and information on the previous time.

In accordance with an illustrative example, there is provided a communication security apparatus of a first node including a receiving unit configured to receive first information from a second node at a previous time, wherein the previous time is recognized by the first node and the second node. The communication security apparatus includes an encrypting unit configured to encrypt second information using the first information and information on the previous time. The communication security apparatus includes a transmitting unit configured to transmit the encrypted second information to the second node at a next time.

In accordance with an illustrative example, a communication security apparatus of a second node includes a transmitting unit configured to transmit first information to a first node at a previous time. The previous time is recognized by the first node and the second node. The communication security apparatus includes a receiving unit configured to receive encrypted second information from the first node at a next time. The communication security apparatus includes a decrypting unit configured to decrypt the encrypted second information using the first information and information on the previous time.

In accordance with an illustrative example, a computer program embodied on a non-transitory computer readable medium is provided. The computer program being configured to control a processor of a first node to perform receiving first information from a second node at a previous time, the previous time being recognized by the first node and the second node, encrypting second information using the first information and information on the previous time, and transmitting the encrypted second information to the second node at a next time.

In accordance with an illustrative example, a computer program embodied on a non-transitory computer readable medium is provided. The computer program being configured to control a processor of a second node to perform transmitting first information to a first node at a previous time, the previous time being recognized by the first node and the second node, receiving encrypted second information from the first node at a next time, and decrypting the encrypted second information using the first information and information on the previous time.

Other features and aspects will be apparent from the following detailed description, the drawings, and the claims.

Figure 1:
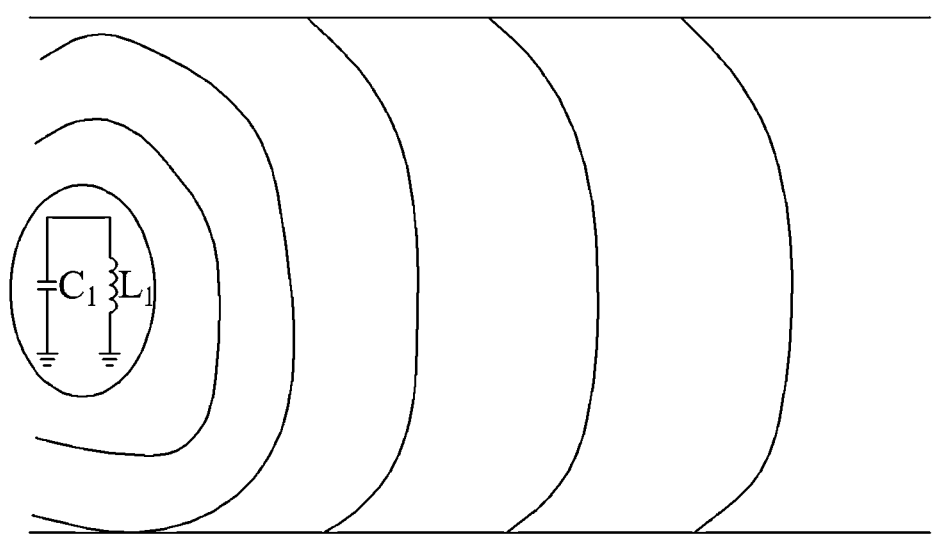
FIG. 1 is a diagram illustrating an example of a near field in which a single resonator exists, in accordance with an illustrative embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
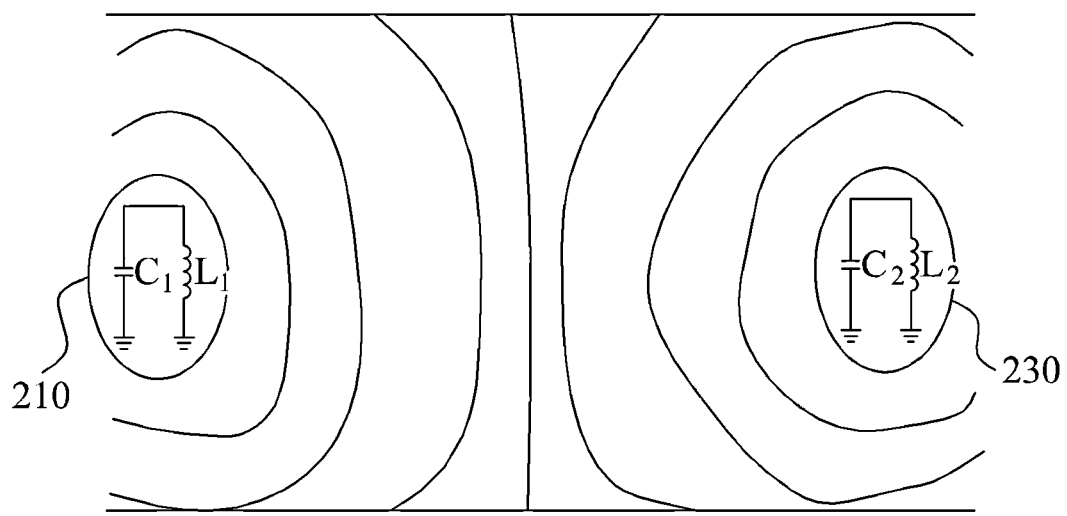
FIG. 2 is a diagram illustrating an example of a near field including a plurality of resonators, in accordance with an illustrative embodiment.

FIG. 1 illustrates an example of a near field in which a single resonator exists, and FIG. 2 illustrates an example of a near field in which resonators exist.

In a wireless communication technology using a physical characteristic of a traveling wave in a far field, mutual influence between a transmitter and a receiver communicating with each other may be ignored. For example, in this channel environment, while transmitting a signal, the transmitter may not physically detect existence or nonexistence of the receiver. The transmitter may transmit a signal to desired media (for example, free space), and the receiver in the far field may receive the signal transferred through the media.

In the above channel environment, a communication device other than the transmitter and the receiver may exist in the same channel as the transmitter or the receiver. However, there is no physical system or method available to determine whether a signal transmitted by the transmitter is detected at an authorized or secured receiver. In one example, in the far field, security may be ensured using encryption and decryption by a logical method at a higher layer, rather than using a security technology at a physical layer. However, using initially stored energy, a single magnetic resonator isolated in free space may form a static magnetic field that exponentially decays around the resonator. In an illustrative example, a magnetic resonator may be represented as a node.

As illustrated in FIG. 1, a near magnetic field may be formed by a single resonator. For example, when a plurality of resonators with the same resonant frequency as the single resonator are disposed sufficiently close to the single resonator, energy stored in each of the plurality of resonators may move between the plurality of resonators, due to magnetic resonance. In other words, a near magnetic field may be formed for each of the plurality of resonators. Accordingly, the near magnetic field formed by the single resonator may be changed due to existence of the plurality of resonators.

FIG. 2 illustrates an example of a change in magnetic field in an environment including a plurality of resonators. For example, when a second resonator 230 approaches a near magnetic field formed by a first resonator 210, existing energy stored in the first resonator 210 may be shared with the second resonator 230 due to a mutual resonance phenomenon. As a result of energy sharing, the near magnetic field of the first resonator 210 may change.

Based on the mutual resonance phenomenon in the near field, energy or information may be transferred between resonators. When initial energy is enabled to flow in the first resonator 210. When the second resonator 230 approaches the first resonator 210, as illustrated in FIG. 2, energy may be exchanged between the first resonator 210 and the second resonator 230 due to the mutual resonance phenomenon. Energy transfer may be achieved when the second resonator 230 captures the energy and stores the captured energy during the energy exchange.

In this example, appropriate information may be modulated and demodulated by adjusting an amount of initial energy flowing in the first resonator 210, or by detecting an amount of energy transferred to the second resonator 230. The above information transfer method is referred to as an "Induced Energy (IE) modulation."

Energy transfer between two resonators may be implemented in a linear system. For example, when initial energy flows in each of a first resonator and a second resonator, energy initially stored in the first resonator is transferred in a direction towards the second resonator. The transfer of energy from the first resonator to the second resonator may be orthogonal to a direction of energy transferred from the second resonator to the first resonator.

Due to linear combination of energy transfer between two resonators, the two resonators may communicate with each other and transfer information between each other using a full duplex communication scheme. The full duplex communication scheme may be used because, during energy transfer between the two resonators, when time at which energy is transmitted is synchronized with time at which energy is received, one of the two resonators may expect an amount of energy received from the other resonator at a predetermined point in time after the energy transfer begins. Additionally, when the full duplex communication scheme is used, transmission of energy by the second resonator may have no influence on reception of information by the second resonator.

Figure 3:
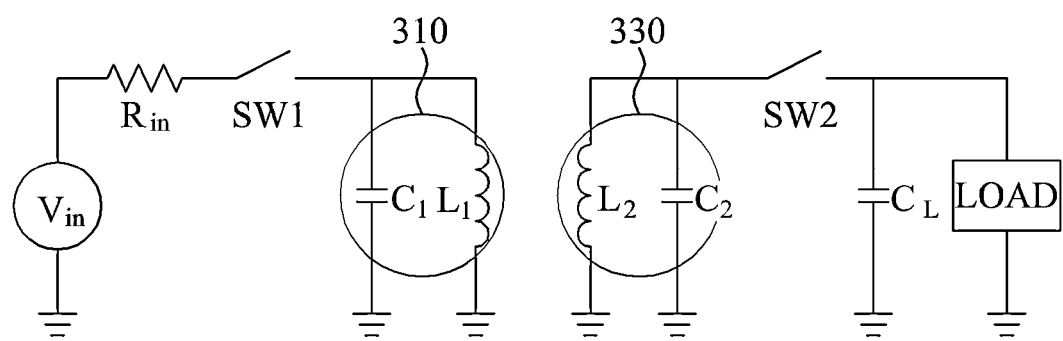
FIG. 3 is a diagram illustrating an example of a resonant isolation (RI) system, in accordance with an illustrative embodiment.

FIG. 3 illustrates an example of a resonant isolation (RI) system, in accordance with an illustrative embodiment.

A first resonator 310 and a second resonator 330 isolated from each other in free space may be implemented by the RI system of FIG. 3. Each of the first resonator 310 and the second resonator 330 may have initial energy.

The RI system of FIG. 3 may employ an inductive charging scheme, and may implement the first resonator 310 and the second resonator 330 by an operation of switch SW 1.

For example, in a left circuit of FIG. 3, when switch SW1 is turned 'ON', energy may be supplied from a power supply unit, namely, direct current (DC) source $V_{in}$. When the first resonator 310 enters a steady state by the energy supplied from the DC source $V_{in}$. Current I with a value of $V_{in}/R_{in}$ may flow through an inductor $L_1$, which may indicate that initial energy $E_1$ with a value of $\frac{1}{2} L_1 I^2$ is stored in the first resonator 310.

Subsequently, when switch SW1 is turned 'OFF,' the first resonator 310 may be physically separated from the DC source $V_{in}$, and may function as an isolated resonator with initial energy $E_1$.

A right circuit of FIG. 3 includes the second resonator 330. For example, when switch SW2 is turned 'OFF,' the second resonator 330 may be implemented as an isolated resonator, similarly to the first resonator 310.

Figure 4:
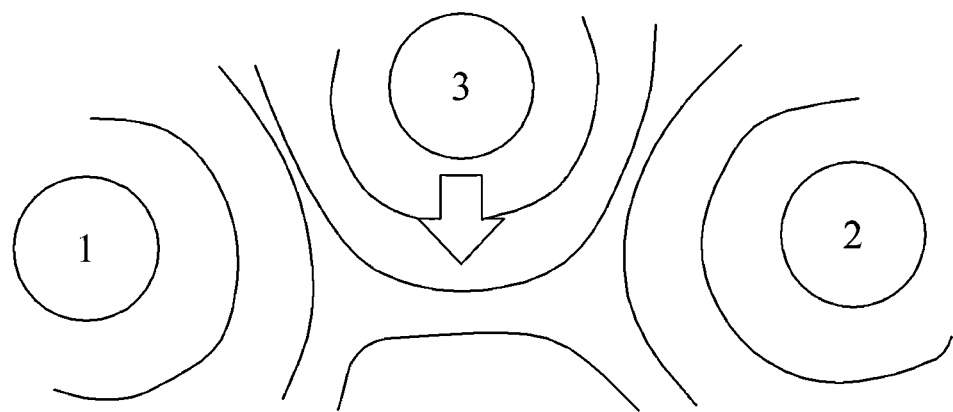
FIG. 4 is a diagram illustrating an example of a change in near field including a plurality of nodes and a third node approaching the near field, in accordance with an illustrative embodiment.

FIG. 4 illustrates an example of a change in near field including a plurality of nodes and a third node approaching the near field, in accordance with an illustrative example. Hereinafter, the term 'node' may be used to refer to a magnetic resonator.

For example, as illustrated in FIG. 4, when a first node and a second node share initial energy due to a mutual resonance and form a near field, and when a third node approaches the near field, the near field may change. As described above, when nodes with the same resonant frequencies are added to the near field, the near field may change.

Figure 5:
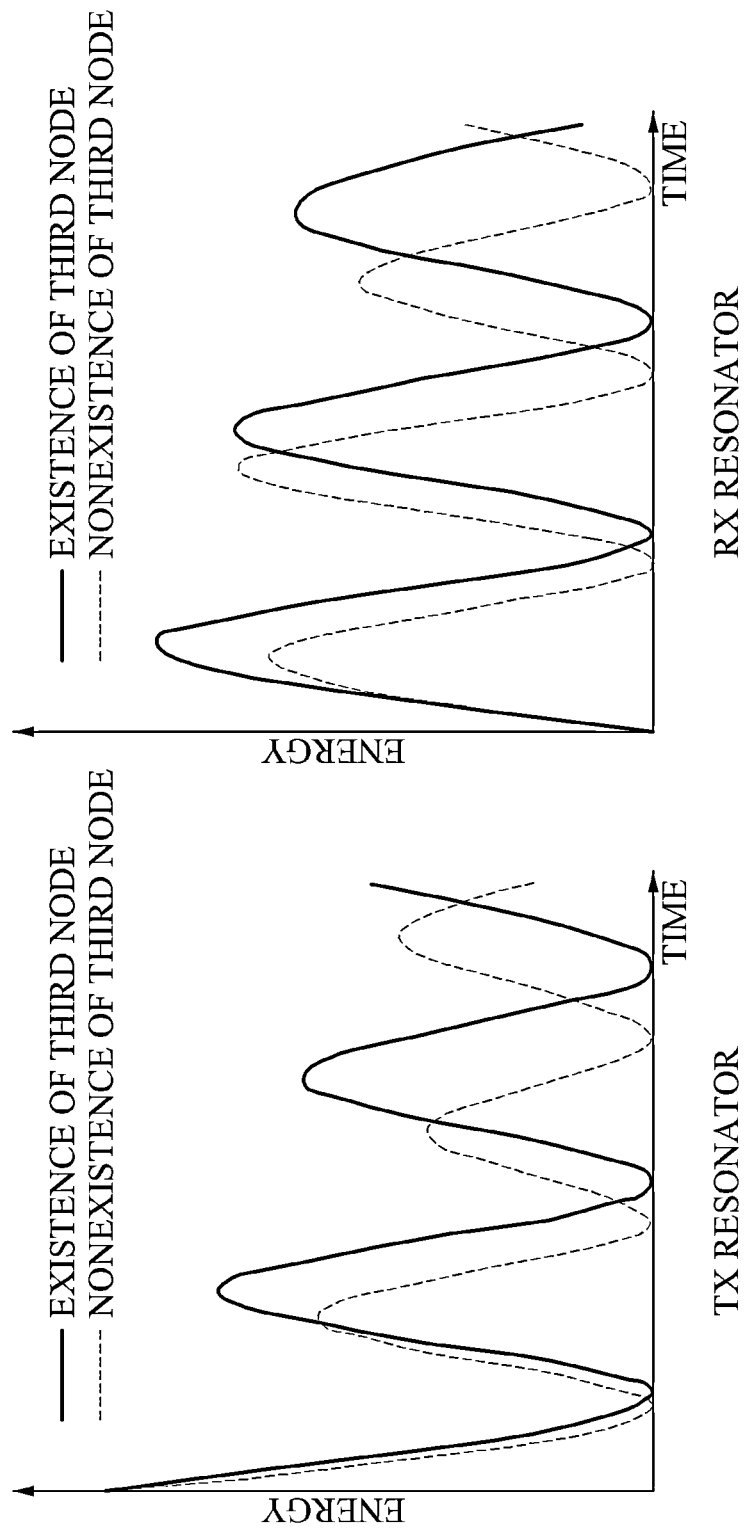
FIG. 5 is a diagram illustrating an example of a change in energy in each of a first node and a second node when a third node approaches a near field in which nodes exist, in accordance with an illustrative embodiment.

FIG. 5 illustrates an example of a change in energy in each of a first node and a second node when a third node approaches a near field including a plurality of nodes, in accordance with an illustrative example.

The first node may be used as a resonator in which initial energy flows, and may function as a transmitting (TX) resonator to transmit information using an IE modulation scheme. Additionally, the second node may be used as a resonator without initial energy, and may function as a receiving (RX) resonator to receive information.

In the near field, stored energy may be changed over time, depending on existence or nonexistence of an additional resonator, for example, the third node. The stored energy may be changed due to a change in exchange of energy caused by a change in the near field. For example, when initial energy stored in the first node is used to exchange energy between the first node and the second node, energy may be exchanged among the first node to the third node. In this example, an amount of energy stored in each of the first node to the third node may change.

A change in the amount of energy stored may be sensed independently by each of the first node to the third node. For example, when the third node approaches the near field during exchange of information between the first node and the second node, the first node and the second node may determine whether the third node exists. The first node and the second node may determine the existence of the third node by analyzing a change in the near field or a rate of a change in the stored energy.

To ensure communication security, when the third node is determined to exist, the first node may interrupt transmission of the information. Additionally, when the third node exists in the near field, the first node may transmit energy to the second node using the IE modulation scheme to prevent the third node from decrypting the information.

In the latter case, due to linear combination of energy transfer between the first node and the second node, information transfer between the first node and the second node may be performed by the full duplex communication scheme. Transmission of energy by the second resonator may have no influence on reception of information by the second resonator. Because energy generated in the second node is superposed on energy stored in the first node, the third node may not decrypt information.

However, when the third node is disposed closer to either the first node or the second node, the third node may decrypt either information of the first node or information of the second node. To prevent the third node from decrypting the information, encryption using a received signal may be performed in the same manner as illustrated in FIG. 6.

Figure 6:
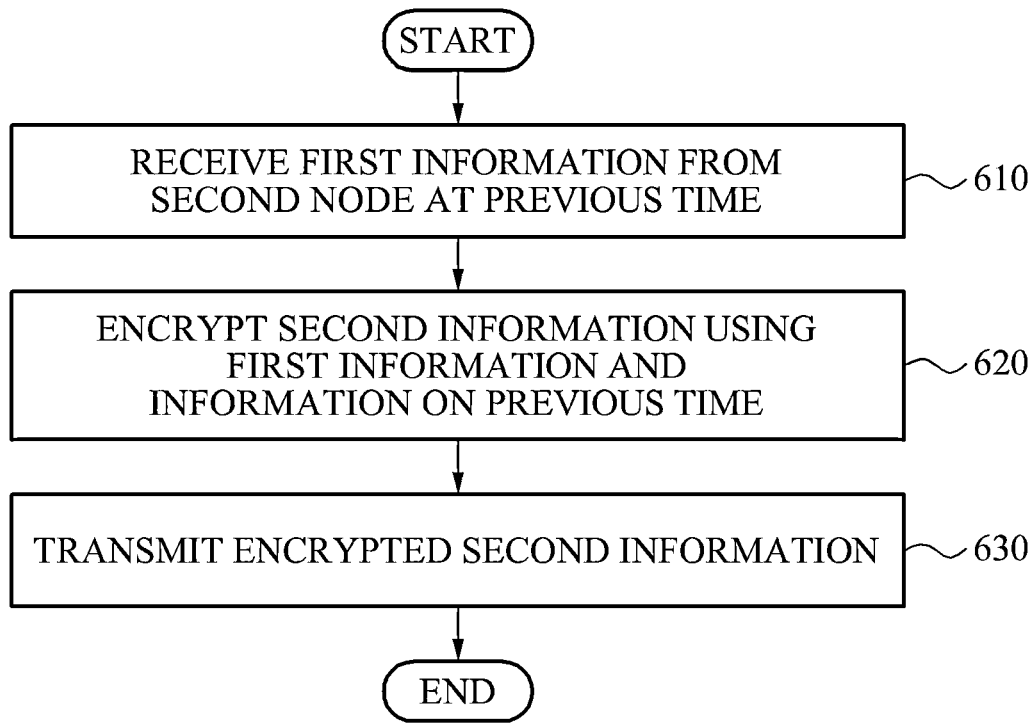
FIG. 6 is a flowchart illustrating an example of a communication security method of a first node, in accordance with an illustrative embodiment.

FIG. 6 illustrates an example of a communication security method of a first node, in accordance with an illustrative configuration.

The communication security method of FIG. 6 may be performed in a near field including the first node and a second node that communicate with each other based on a full duplex communication scheme.

In 610, the first node may receive first information from the second node at a previous time that is recognized by both the first node and the second node.

The previous time may refer to a previous symbol time, for example, two seconds ago, at which a previous third symbol is transmitted, and the like. The previous time may be repeated periodically in advance by a setting between the first node and the second node, or may be aperiodically determined by an indicator indicating the previous time.

In 620, the first node may encrypt second information using the first information and information on the previous time. To encrypt the second information, the first node may perform an eXclusive OR (XOR) operation on the first information and the second information. For example, when the first node receives '1011' as the first information from the second node, and desires to transmit '0010' as the second information to the second node, the first node may perform encoding, for example the XOR operation, on '0010' based on '1011,' to obtain '0110' as encrypted second information.

In 630, the first node may transmit the encrypted second information to the second node at a next time. The next time may refer to a symbol time at which the second information encrypted at a current time is transmitted to the second node.

In the communication security method of FIG. 6, regardless of whether a third node exists in the near field, the first node may encrypt the second information that is to be transmitted to the second node, based on the first information received from the second node at the previous time, and may transmit the encrypted second information to the second node.

Figure 7:
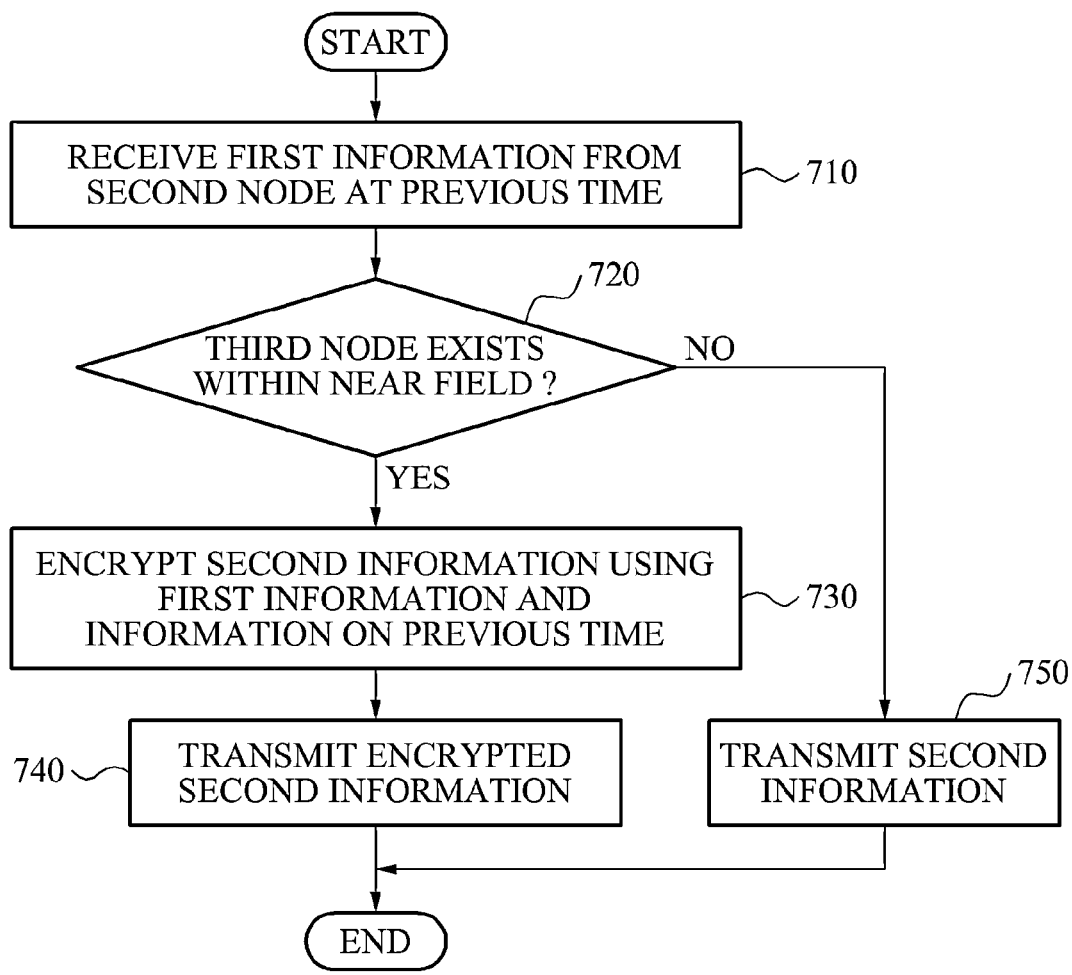
FIG. 7 is a flowchart illustrating another example of a communication security method of a first node, in accordance with another illustrative embodiment.

FIG. 7 illustrates another example of a communication security method of a first node, in accordance with an illustrative configuration.

Referring to FIG. 7, in 710, the first node may receive first information from the second node at a previous time that is recognized by the first node and the second node. As described above, the previous time may be repeated periodically in advance by a setting between the first node and the second node, or may be aperiodically determined by an indicator indicating the previous time.

In 720, the first node may determine whether a third node, distinguished from the second node, exists within the near field. In 720, the first node may determine whether the third node approaches the near field and whether the third node exists within the near field. In the near field, each of the first node and the second node may detect an amount of energy stored in each of the first node and the second node to determine whether the third node exists within the near field. In the alternative, in the near field, each of the first node and the second node may detect a change in energy in the near field to determine whether the third node exists within the near field.

In an example, when the third node is determined to exist in 720, the first node may encrypt the second information, using the first information and information on the previous time in 730. To encrypt the second information, the first node may perform encoding, for example, an XOR operation, on the second information based on the first information.

In 740, the first node may transmit the encrypted second information to the second node at a next time.

In another example, when the third node is determined not to exist in 720, the first node may transmit the second information to the second node, instead of encrypting the second information, in 750.

In the communication security method of FIG. 7, when the first node starts transmission in a typical manner and detects existence of the third node in the near field, the first node may encrypt the second information that is to be transmitted to the second node, and may transmit the encrypted second information to the second node. The first node may encrypt the second information that is to be transmitted to the second node based on the first information received from the second node.

To notify the second node communicating with the first node, that information to be transmitted to the second node is encrypted based on the first information received at the previous time, the first node may transmit the indicator indicating the previous time through a control channel to the second node.

The second node may detect a signal, namely the encrypted second information, and may receive the detected signal. When the third node exists within the near field, the second node may decrypt the second information using the first information transmitted by the second node. When the third node does not exist within the near field, the second node may be directly operated based on the second information, without decrypting the second information using the first information.

Figure 8:
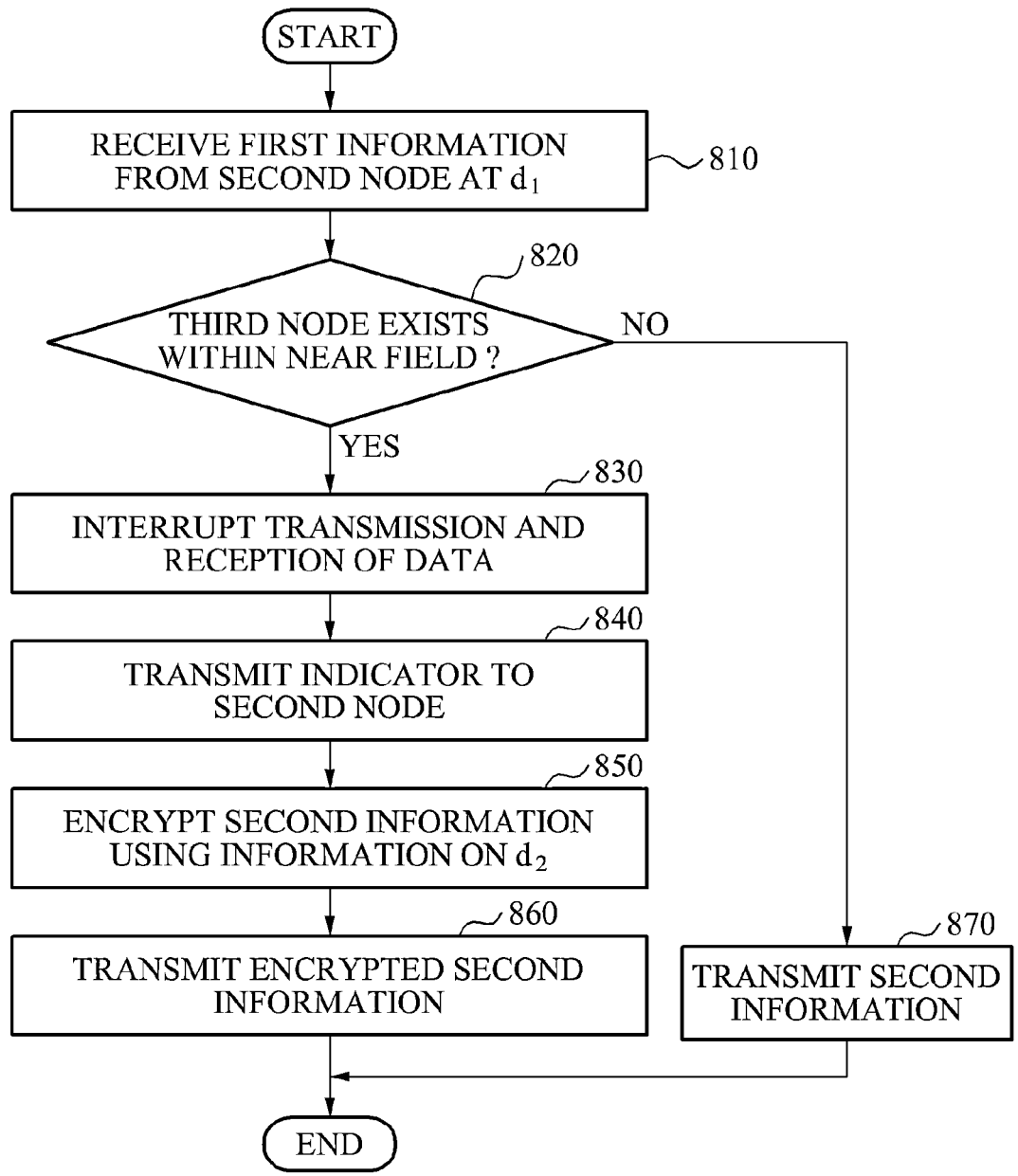
FIG. 8 is a flowchart illustrating still another example of a communication security method of a first node, in accordance with an illustrative embodiment.

FIG. 8 illustrates still another example of a communication security method of a first node, in accordance with an illustrative configuration.

Referring to FIG. 8, in 810, the first node may receive first information from the second node at a previous time $d_1$ that is recognized by the first node and the second node.

In 820, the first node may determine whether a third node distinguished from the second node exists within the near field.

In an example, when the third node is determined to exist in 820, in 830, the first node may interrupt transmission and reception of data between the first node and the second node. The data may include, for example, second information, and other control information.

In 840, the first node may transmit to the second node an indicator indicating a new previous time $d_2$.

In 850, the first node may encrypt the second information using information on the new previous time $d_2$. The information on the new previous time $d_2$ may be different from the first information received in 810.

In one illustrative example, the previous time $d_1$ may be 'two seconds ago,' and the first information transmitted from the second node to the first node may be '1101.' In this example, the first node may notify the second node, using the indicator indicating the new previous time $d_2$, for example, 'four seconds ago,' that information (for example, '1010') transmitted by the second node to the first node four seconds ago is set to be the first information.

Subsequently, the first node may encrypt the second information using '1010' as the first information determined based on the information on the new previous time $d_2$. The information on the new previous time $d_2$ may be used to inform that the information transmitted to the first node four seconds ago is set to be the first information.

In 860, the first node may transmit the encrypted second information to the second node.

The second node, namely a receiver, may decrypt the encrypted second information using information transmitted to the first node at the new previous time $d_2$.

In another example, when the third node is determined not to exist in 820, the first node may transmit the second information to the second node, instead of encrypting the second information, in 870.

In the communication security method of FIG. 8, when existence of the third node within the near field is detected during transmitting of non-encrypted information to the second node based on received information, the first node may exchange a new encryption key (namely, the information on the new previous time $d_2$) with the second node. The first node may also encrypt information that is to be transmitted.

Thus, it is possible to encrypt transmitted data and received data through encryption based on received information. With the configuration of FIG. 8, it is also possible to periodically or aperiodically exchange an encryption key, thereby strengthening security.

Figure 9:
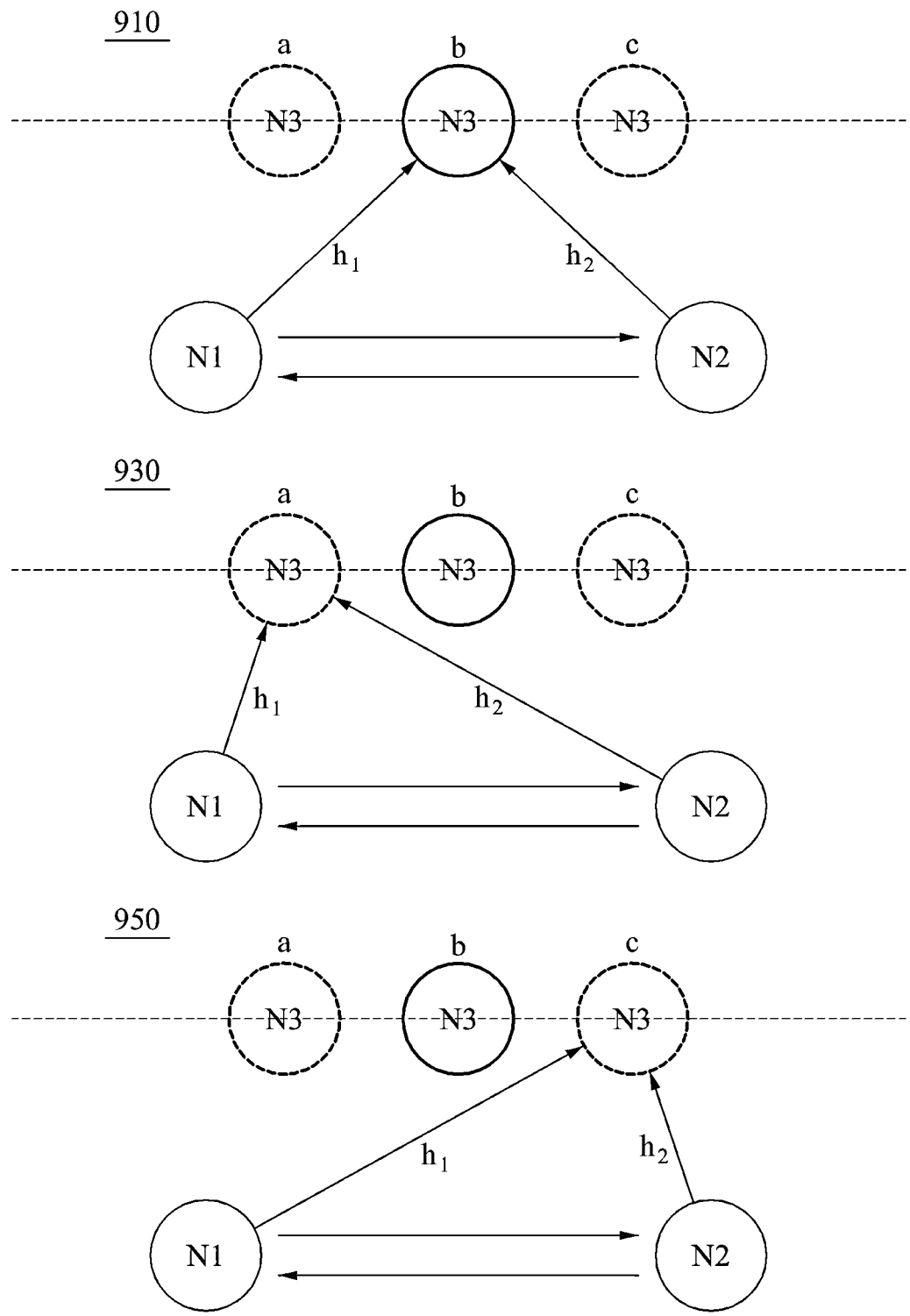
FIG. 9 is a diagram illustrating an example of a concept in which a first node and a second node ensure communication security using a full duplex communication scheme when a third node approaches a near field including a plurality of nodes, in accordance with an illustrative embodiment.

FIG. 9 illustrates an example of a concept in which a first node and a second node ensure communication security using a full duplex communication scheme when a third node approaches a near field in which multiple nodes exist.

To ensure the communication security, the first node may encrypt information that is to be transmitted to the second node, through coding with information received at a previous time from the second node. The first node may also transmit the encrypted information to the second node. Similarly, the second node may encrypt information that is to be transmitted to the first node. The second node may also transmit the encrypted information to the first node. The coding may include, for example, superposition, an XOR operation, and the like.

For example, information transmitted by the first node, and information transmitted by the second node may be represented by $X_1=[x_1(1), x_1(2), x_1(3), \ldots]$, and $X_2=[x_2(1), x_2(2), x_2(3), \ldots]$, respectively.

When encryption is performed using the XOR operation, signals $C_1(n)$ and $C_2(n)$ transmitted by the first node and the second node, respectively, at an n-th previous symbol time may be represented as shown in Equation 1:

$$C_1(n) = x_1(n) \otimes x_2(n-d_1)$$

$$C_2(n) = x_2(n) \otimes x_1(n-d_2) \qquad \text{[Equation 1]}$$

In Equation 1, $x_2(n-d_1)$ denotes information received by the first node from the second node at a previous time $d_1$, $x_1(n-d_2)$ denotes information received by the second node from the first node at a previous time $d_2$, $x_2(n)$ denotes information received by the first node from the second node, and $x_1(n)$ denotes information received by the second node from the first node.

At the n-th previous symbol time, a signal received by the third node may be represented as shown in Equation 2:

$$y_1(n) = \sqrt{h_1} C_1(n) + \sqrt{h_2} C_2(n) = \sqrt{h_1}(x_1(n) \otimes x_2(n-d_1)) + \sqrt{h_2}(x_2(n) \otimes x_1(n-d_2))$$ [Equation 2]

In Equation 2, $h_1$ denotes a signal strength of a signal of a first node transmitted to a third node, and $h_2$ denotes a signal strength of a signal of a second node transmitted to the third node.

Hereinafter, signal characteristics based on a position of the third node will be described.

Referring to FIG. 9, in a case 910 in which the third node is located at a point 'b,' signals from the first node and the second node may be superposed, because the signal strength $h_1$ is similar to the signal strength $h_2$. Accordingly, the third node may not decrypt information $x_1(n)$ transmitted by the first node, and information $x_2(n)$ transmitted by the second node.

In a case 930 in which the third node is located at a point 'a,' the signal strength $h_2$ may be much weaker than the signal strength $h_1$. Accordingly, the third node may determine a signal of the second node to be noise. Due to weak signal strength $h_2$, the third node may not detect the signal of the second node.

In a case 950 in which the third node is located at a point 'c,' the signal strength $h_1$ may be much weaker than the signal strength $h_2$. Accordingly, the third node may determine a signal of the first node to be noise. Due to weak signal strength $h_1$, the third node may not detect the signal of the first node.

In general, at the points 'a' and 'b,' the third node may detect encrypted information received from each of the first node and the second node. However, to obtain information transmitted by the first node and the second node, the third node needs to know information transferred from the first node or the second node at a previous symbol time corresponding to previous time $d_1$ or $d_2$. Because the information is not known, it may be impossible for the third node to decode information transmitted from the first node and the second node. For example, when encryption is performed using a security code shared by both a TX node and an RX node, and when the security code is hacked, transmitted information may continue to be leaked.

However, in the communication security method according to some embodiments, encryption may be performed based on information transmitted in real-time and, as a result, it is possible to realize a much higher complementarity with respect to an attempt to eavesdrop on data, compared to a conventional method.

Figure 10:
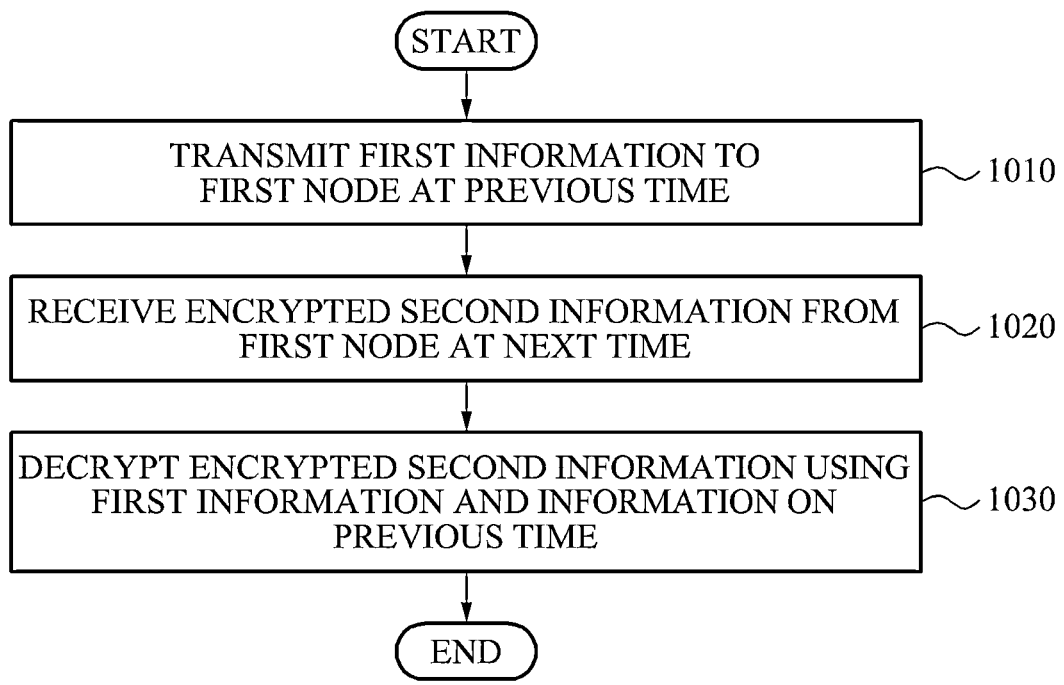
FIG. 10 is a flowchart illustrating an example of a communication security method of a second node, in accordance with an illustrative embodiment.

FIG. 10 illustrates an example of a communication security method of a second node, in accordance with an illustrative embodiment. The communication security method of FIG. 10 may be performed in a near field including a first node and the second node that communicate with each other based on a full duplex communication scheme.

In 1010, the second node may transmit first information to the first node at a previous time that is recognized by the first node and the second node. The previous time may refer to a previous symbol time, for example, two seconds ago, a time at which a previous third symbol is transmitted, and the like. The previous time may be repeated periodically in advance by a setting between the first node and the second node, or may be aperiodically determined by an indicator indicating the previous time.

In 1020, the second node may receive the encrypted second information from the first node at a next time.

In 1030, the second node may decrypt the encrypted second information, using the first information, and information on the previous time. To decrypt the second information, the second node may perform an XOR operation on the first information and the second information. The information on the previous time may include an indicator indicating the previous time.

Additionally, based on a change in energy in the near field, the second node may determine whether a third node distinguished from the first node exists within the near field. Furthermore, the second node may receive the indicator.

Figure 11:
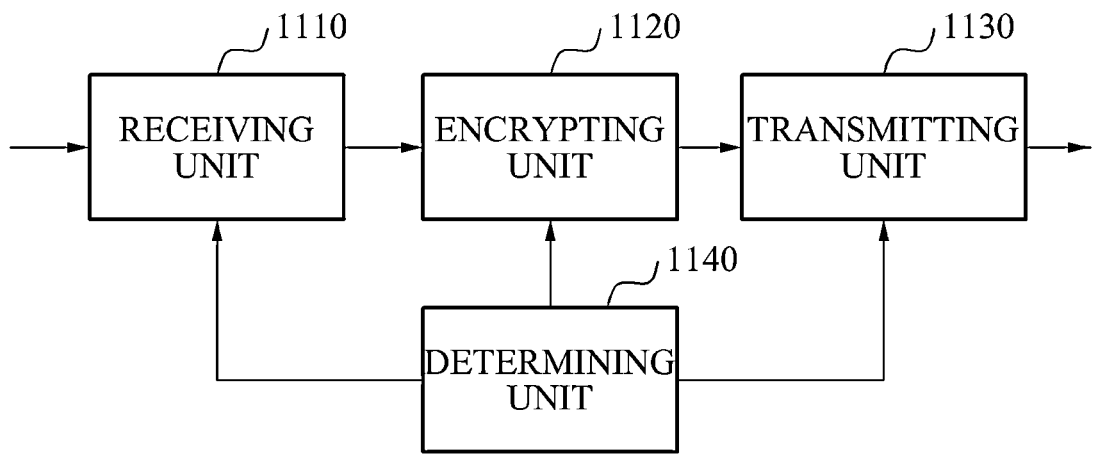
FIG. 11 is a block diagram illustrating an example of a communication security apparatus of a first node, in accordance with an illustrative embodiment.

FIG. 11 illustrates a communication security apparatus 1100 of a first node, in accordance with an illustrative embodiment.

The communication security apparatus 1100 may be implemented in a near field including the first node and a second node that communicate with each other based on a full duplex communication scheme.

Referring to FIG. 11, the communication security apparatus 1100 includes a receiving unit 1110, an encrypting unit 1120, a transmitting unit 1130, and a determining unit 1140.

The receiving unit 1110 may receive first information from the second node, at a previous time, which is recognized by the first node and the second node. In one example, the previous time may refer to a previous symbol time, for example, two seconds ago, a time at which a previous third symbol is transmitted, and the like. The previous time may be repeated periodically in advance by a setting between the first node and the second node. In the alternative, the previous time may be aperiodically determined by an indicator indicating the previous time.

The encrypting unit 1120 may encrypt second information, using the first information, and information on the previous time. The information on the previous time may include an indicator indicating the previous time.

The transmitting unit 1130 may transmit the encrypted second information to the second node at a next time. Additionally, the transmitting unit 1130 may transmit the indicator indicating the previous time.

The determining unit 1140 may determine whether a third node distinguished from the second node exists within the near field.

Figure 12:
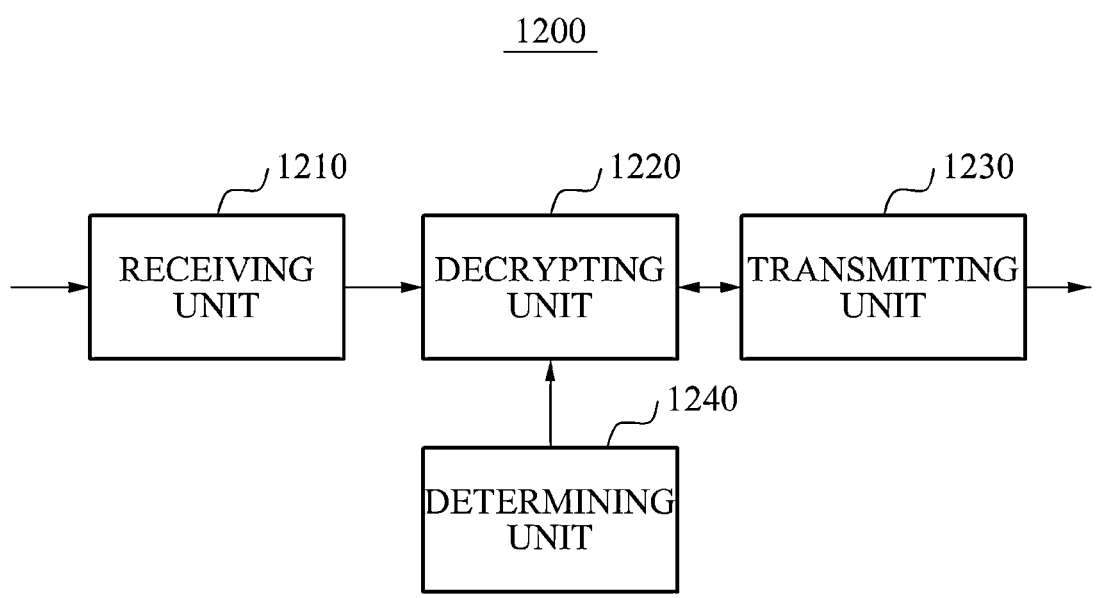
FIG. 12 is a block diagram illustrating an example of a communication security apparatus of a second node, in accordance with an illustrative embodiment.

FIG. 12 illustrates a communication security apparatus 1200 of a second node, in accordance with an illustrative embodiment.

The communication security apparatus 1200 may be implemented in a near field including the first node and the second node that communicate with each other based on a full duplex communication scheme.

Referring to FIG. 12, the communication security apparatus 1200 includes a receiving unit 1210, a decrypting unit 1220, a transmitting unit 1230, and a determining unit 1240.

The receiving unit 1210 may receive encrypted second information from the first node at a next time. The receiving unit 1210 may receive an indicator indicating a previous time.

The decrypting unit 1220 may decrypt the second information using first information and information on the previous time. The decrypting unit 1220 may perform an XOR operation on the first information and the second information, and may decrypt the second information. The information on the previous time may include the indicator indicating the previous time.

The transmitting unit 1230 may transmit the first information to the first node at a previous time that is recognized by the first node and the second node.

The determining unit 1240 may determine whether a third node distinguished from the first node exists within the near field.

Figure 13:
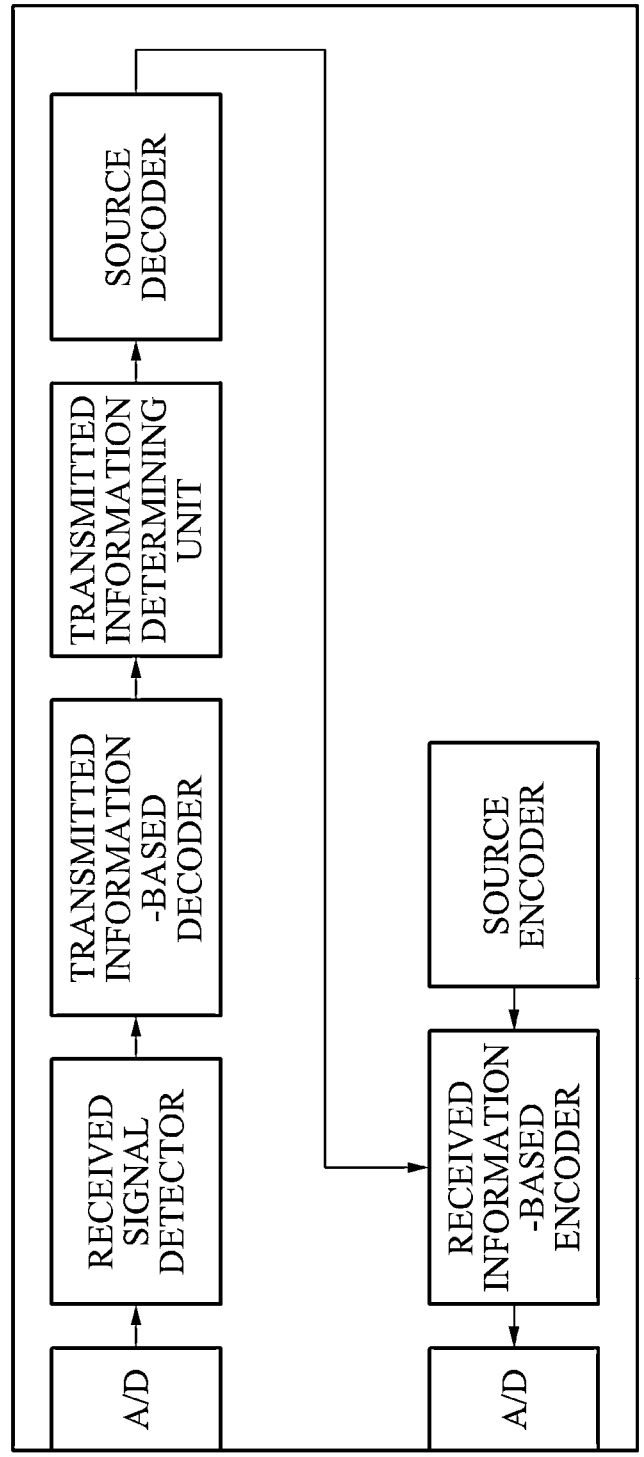
FIG. 13 is a diagram illustrating a structure of a communication security apparatus of a first node and a second node, in an example in which transmitted information is encoded based on received information and the encoded information is transmitted, regardless of whether a third node exists in a near field in which a plurality of nodes exist, in accordance with an illustrative embodiment.

FIG. 13 illustrates a structure of a communication security apparatus of a first node and a second node, in accordance with an illustrative configuration. In FIG. 13, transmitted information is encoded based on received information and the encoded information is transmitted, regardless of whether a third node exists in a near field in which a plurality of nodes exist.

Figure 14:
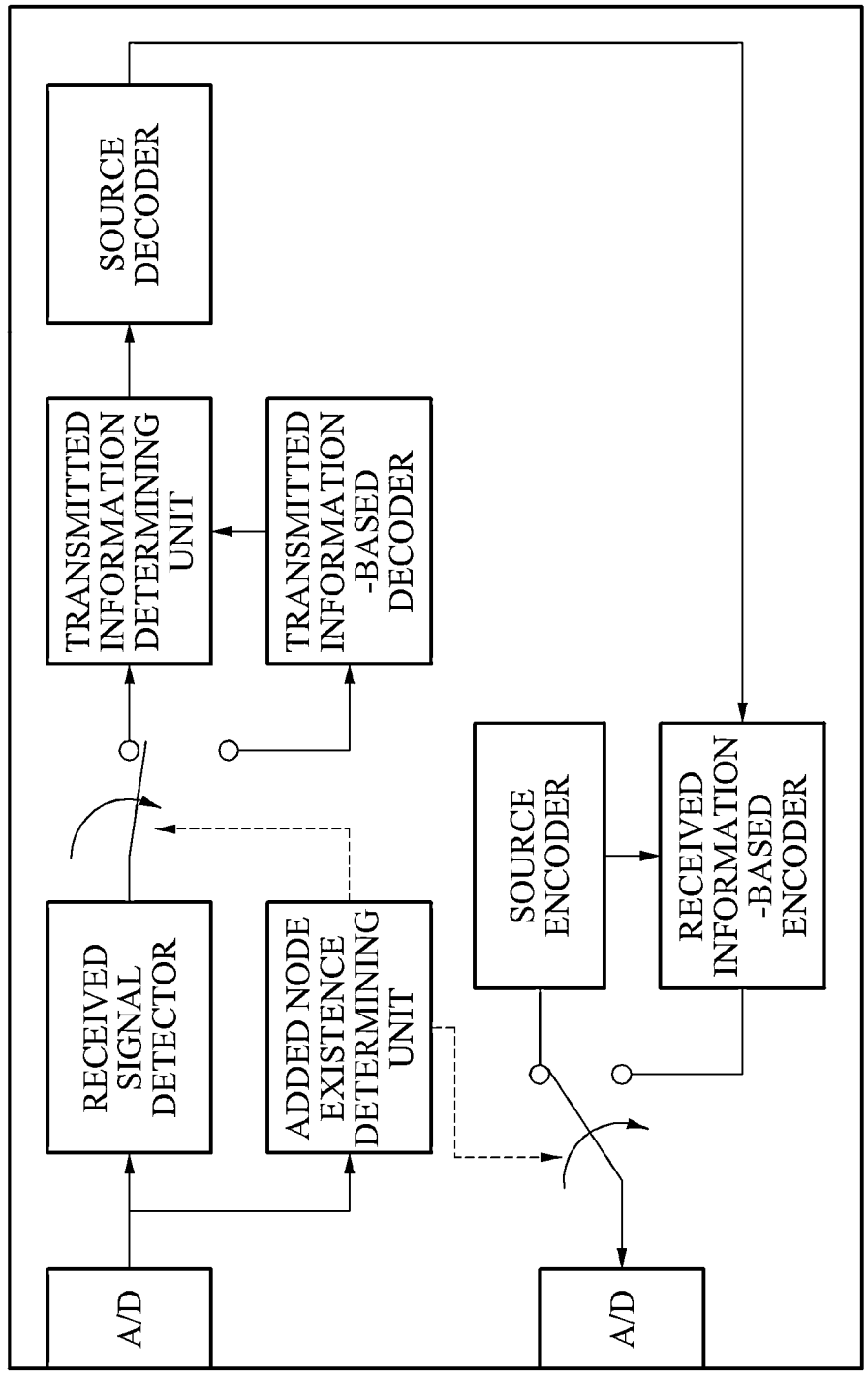
FIG. 14 is a diagram illustrating a structure of a communication security apparatus of a first node and a second node, in an example in which a third node is determined to approach a near field including a plurality of nodes, in accordance with an illustrative embodiment.

FIG. 14 illustrates a structure of a communication security apparatus of a first node and a second node, in accordance with an illustrative configuration. In FIG. 14, a third node is determined to approach a near field in which multiple nodes exist.

The communication security method according to various embodiments may be used, for example, for security when communication is performed between two devices within a physically accessible distance. In one example, the communication security method may be used between devices with a distance from a few tens of centimeters (cm) to a few meters (m). Furthermore, the communication security method may be also used when eavesdrop on information exchanged between the two devices is required through a communication device other than the two devices.

Additionally, the communication security method, according to illustrative embodiments, may be applicable to a Near Field Communication (NFC) system employing a near magnetic field channel, a Radio Frequency Identification (RFID) system, a near-distance communication system, and the like.

According to various embodiments, information to be transmitted may be encrypted based on information received at a previous time, which is recognized by a TX node and an RX node. As a result, it may be possible to prevent the information from being decrypted by another node within a near field and simultaneously to transmit and receive reliable data.

Additionally, according to various embodiments, information to be transmitted may be encrypted based on a signal received from a receiver, and the encrypted information may be transmitted As a result, it is may be possible to perform the same operation as changing of an encryption key in real time during encryption.

Furthermore, according to various embodiments, information may be encrypted by an indicator indicating a previous time by periodically or aperiodically using a new encryption key, namely information on a new previous time As a result, it is may be possible to prevent the information from being decrypted in a physical layer, and to strengthen security.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

It is to be understood that in the embodiment of the present invention, the operations in FIGS. 6-8 and 10 are performed in the sequence and manner as shown although the order of some steps and the like may be changed without departing from the spirit and scope of the present invention.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication security method of a first node, the communication security method comprising:
   receiving items of first information from a second node at previous times, the previous times known by the first node and the second node;
   selecting one of the items of first information based upon information of one of the known previous times;
   encrypting second information, wherein the second information differs from the first information, using the selected item of first information; and
   transmitting the encrypted second information to the second node at a next time,
   wherein the previous times are repeated periodically in advance by a setting between the first node and the second node, or aperiodically determined by an indicator indicating the known previous times.

2. The communication security method of claim 1, wherein the encrypting comprises encoding the second information based on the selected item of first information.

3. The communication security method of claim 1, wherein a near field comprises the first node and the second node that communicate with each other based on a full duplex communication scheme.

4. The communication security method of claim 3, further comprising:
   determining whether a third node exists within the near field, wherein
   the third node is distinguished from the second node.

5. The communication security method of claim 4, wherein the determining comprises determining whether the third node exists based on a change in energy in the near field.

6. The communication security method of claim 4, further comprising interrupting transmission and reception of data between the first node and the second node, when the third node is determined to exist.

7. The communication security method of claim 1, further comprising:
   transmitting an indicator indicating the one previous time, wherein
   the information of the one previous time is identified by the indicator.

8. A communication security method of a second node, the communication security method comprising:
   transmitting items of first information to a first node at previous times, the previous times known by the first node and the second node;
   receiving encrypted second information from the first node at a next time;
   selecting one of the items of first information based upon information of one of the known previous times; and
   decrypting the encrypted second information using the selected item of first information, wherein the encrypted second information differs from the first information,
   wherein the previous times are repeated periodically in advance by a setting between the first node and the second node, or aperiodically determined by an indicator indicating the known previous times.

9. The communication security method of claim 8, wherein the decrypting comprises decoding the second information based on the selected item of first information.

10. The communication security method of claim 8, wherein a near field comprises the first node and the second node that communicate with each other based on a full duplex communication scheme.

11. The communication security method of claim 10, further comprising determining whether a third node exists within the near field, the third node being distinguished from the first node.

12. The communication security method of claim 11, wherein the determining comprises determining whether the third node exists based on a change in energy in the near field.

13. The communication security method of claim 8, further comprising:
   receiving an indicator indicating the one previous time, wherein
   the information of the one previous time is identified by the indicator.

14. The communication security apparatus of claim 12, wherein:
   the information of the one previous time is identified by an indicator, and the transmitting unit transmits the indicator.

15. A communication security apparatus of a first node, the communication security apparatus comprising:
   a receiving unit configured to receive items of first information from a second node at previous times, wherein the previous times are known by the first node and the second node;
   an encrypting unit configured to encrypt second information, wherein the second information differs from the first information, using a selected one of the items of first information; and
   a transmitting unit configured to transmit the encrypted second information to the second node at a next time, wherein:
   the selected item of first information is selected from the items of first information based upon information of one of the known previous times, and
   wherein the previous times are repeated periodically in advance by a setting between the first node and the second node, or aperiodically determined by an indicator indicating the known previous times.

16. The communication security apparatus of claim 15, wherein a near field comprises the first node and the second node that communicate with each other based on a full duplex communication scheme.

17. The communication security apparatus of claim 16, further comprising:
   a determining unit configured to determine whether a third node exists within the near field, wherein
   the third node is distinguished from the second node.

18. A communication security apparatus of a second node, the communication security apparatus comprising:
   a transmitting unit configured to transmit items of first information to a first node at previous times, wherein the previous times are known by the first node and the second node;
   a receiving unit configured to receive encrypted second information from the first node at a next time; and
   a decrypting unit configured to decrypt the encrypted second information using a selected item of first information, wherein:
   the selected item of first information is selected from the items of first information based upon information of one of the known previous times, and
   the encrypted second information differs from the first information, and
   the previous times are repeated periodically in advance by a setting between the first node and the second node, or aperiodically determined by an indicator indicating the known previous times.

19. The communication security apparatus of claim 18, wherein the decrypting unit decodes the second information based on the selected item of first information.

20. The communication security apparatus of claim 18, wherein:
   the information of the one previous time is identified by an indicator, and
   the receiving unit receives the indicator.

21. A computer program embodied on a non-transitory computer readable medium, the computer program being configured to control a processor of a first node to perform:
   receiving items of first information from a second node at previous times, the previous times known by the first node and the second node;
   selecting one of the items of first information based upon information of one of the known previous times;
   encrypting second information, wherein the second information differs from the first information, using the selected item of first information; and transmitting the encrypted second information to the second node at a next time, wherein the previous times are repeated periodically in advance by a setting between the first node and the second node, or aperiodically determined by an indicator indicating the known previous times.

22. A computer program embodied on a non-transitory computer readable medium, the computer program being configured to control a processor of a second node to perform:

transmitting items of first information to a first node at previous times, the previous times known by the first node and the second node;

receiving encrypted second information from the first node at a next time;

selecting one of the items of first information based upon information of one of the known previous times; and decrypting the encrypted second information using the selected item of first information, wherein the encrypted second information differs from the first information, wherein the previous times are repeated periodically in advance by a setting between the first node and the second node, or aperiodically determined by an indicator indicating the known previous times.

23. A communication method executed by a communication node, the method comprising:

receiving each of multiple items of information from another communication node at a distinct communication time;

encrypting data, wherein the data differs from the received information, using a particular item of the received information;

transmitting, to the other communication node, the encrypted data along with an indicator of a communication time, which communication time uniquely identifies the particular item of received information, wherein the distinct communication time is repeated periodically in advance by a setting between the communication node and another communication node, or aperiodically determined by an indicator indicating the distinct communication time.

24. A communication method executed by a communication node, the method comprising:

transmitting each of multiple items of information to another communication node at a distinct communication time;

receiving, from the other communication node, encrypted data and an indicator of a particular communication time; and decrypting the encrypted data, wherein the encrypted data differs from the transmitted information, using a particular item of the transmitted information that is uniquely identified by the indicated communication time, wherein the distinct communication time is repeated periodically in advance by a setting between the communication node and another communication node, or aperiodically determined by an indicator indicating the distinct communication time.

* * * * *